(12) United States Patent
Okamoto et al.

(10) Patent No.: US 6,475,665 B1
(45) Date of Patent: Nov. 5, 2002

(54) LEAD ACID STORAGE BATTERY

(75) Inventors: Hiroshi Okamoto, Hamamatsu (JP); Kazuyoshi Yonezu, Toyohashi (JP); Shozo Murochi, Toyohashi (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/398,581

(22) Filed: Sep. 17, 1999

(30) Foreign Application Priority Data

Sep. 18, 1998 (JP) .......................................... 10-264650
Oct. 2, 1998 (JP) .......................................... 10-280803

(51) Int. Cl.⁷ ................................................ H01M 2/18
(52) U.S. Cl. ........................ 429/139; 429/136; 429/146
(58) Field of Search ................................ 429/136, 139, 429/146, 147

(56) References Cited

U.S. PATENT DOCUMENTS

| | | |
|---|---|---|
| 5,401,278 A | 3/1995 | Yasuda et al. |
| 5,558,952 A | 9/1996 | Knauer |
| 5,716,734 A | 2/1998 | Nakano |

FOREIGN PATENT DOCUMENTS

| | | |
|---|---|---|
| EP | 0 541 124 A2 | 5/1993 |
| JP | 57196474 A | 12/1982 |
| JP | 58165245 A | 9/1983 |
| JP | 04167356 A | 6/1992 |
| JP | 05307949 | 11/1993 |

OTHER PUBLICATIONS

Higashi et al., J. Power Sources, 73 (1998) 110–121 (no month available).*

* cited by examiner

*Primary Examiner*—Carol Chaney
(74) *Attorney, Agent, or Firm*—Akin, Gump Strauss, Hauer & Feld, L.L.P.

(57) ABSTRACT

The present invention provides a lead acid storage battery keeping sufficient cycle life even under vibrating conditions. The lead acid storage battery of the present invention includes an assembly element that is obtained by alternately laying positive electrode plates, each positive electrode plate having an expanded grid, and negative electrode plates, each negative electrode plate being accommodated in a bag-like separator, one upon another. The separator is provided by folding a fine porous synthetic resin sheet and sealing left and right overlapping sides of the folded sheet to have a bag-like shape. The separator has a plurality of vertical ribs that are formed in parallel to one another on an outer surface of the separator and that are located in a central portion of the separator occupying a most part of its width. The separator further has small rib areas that extend along a length of the bag-like separator and that are arranged on left and right sides thereof. Each of the small rib areas includes a large number of small ribs that intersect a left or right side end of the positive electrode plate.

10 Claims, 6 Drawing Sheets

LEAD ACID STORAGE BATTERY

BACKGROUND OF THE INVENTION

The present invention relates to a lead acid storage battery especially used for automobiles.

In lead acid storage batteries for automobiles, either one of a positive electrode plate and a negative electrode plate, which are obtained respectively by filling a grid with a paste of active material is accommodated in a bag-like separator that is composed of a fine porous synthetic resin sheet A plurality of vertical ribs are formed in parallel to one another on an inner surface of the bag-like separator and are arranged to extend along a vertical axis of the electrode plate. This arrangement causes a certain quantity of electrolyte to be present around the electrode plate in the bag-like separator, and prevents the inner surface of the separator from being in direct contact with the surface of the electrode plate received in the separator.

The bag-like separator separates the positive electrode plate from the negative electrode plate and causes the active material falling off the grid an the course of the use of the storage battery to be reserved in the separator bag, thereby preventing an electric short circuit between the positive electrode and the negative electrode.

The active material of the positive electrode plate is readily and significantly softened and falls off the grid by the repeated charge and discharge, compared with the active material of the negative electrode plate. The general configuration thus accommodates the positive electrode plate in the bag-like separator. The bag-like separator in which the positive electrode plate is accommodated, advantageously interferes with the fall-off of the active material of the positive electrode even if the active material is softened to some extent.

With a recent trend of the high-performance engine and the compact body, the engine room in automobiles tends to be exposed to extremely high temperatures. When the storage battery is used at high temperatures, the corrosion of the grid of the positive electrode plate proceeds to worsen the cycle life of the storage battery especially when an antimony-free lead-calcium-tin alloy is used for the grid of the positive electrode plate and the negative electrode plate in order to prevent a decrease in volume of the electrolyte under the high temperature conditions, the corrosion of the grid of the positive electrode plate is prominent and significantly worsens the cycle life of the storage battery One proposed technique to prevent the cycle life of the battery from being worsened enhances the strength of the grid For example, the technique disclosed in Japanese Laid-open Patent No. Hei 5-290857 raises the concentration of tin in the lead-calcium-tin alloy, which forms an expanded grid of the positive electrode plate, thereby ensuring the sufficient strength of the grid and improving the cycle life of the storage battery. The expanded grid of the positive electrode plate reduces the degree of corrosion and improves the life cycle of the battery. The positive electrode plate of the expanded grid accommodated in the bag-like separator, however, may break the bottom of the bag-like separator to cause a short circuit between the positive electrode and the negative electrode and abruptly worsen the cycle life of the battery. The expanded grid has a lower degree of corrosion than the conventional grid, but expands in a specific expanding work direction due to the corrosion. This causes the bottom of the separator to be damaged. The structure that applies an expanded grid for the positive electrode plate and accommodates the positive electrode plate in the bag-like separator by taking into account the possible corrosion of the grid under the high temperature condition is an effective countermeasure to enhance the strength of the grid. The problem of this technique is that the expansion of the expanded grid in the specific expanding work direction damages the separator and thereby abruptly worsens the life cycle of the battery.

One proposed technique to solve this problem accommodates the negative electrode plate in the bag-like separator, instead of the positive electrode plate made of the expanded grid. This arrangement prevents the positive electrode plate from going the bottom of the bag-like separator, but causes another problem, that is, fall-off of the active material from the expanded grid of the positive electrode plate. In the conventional structure, the softened active material of the positive electrode falls off the grid little by little. In this proposed structure, on the other hand, the active material of the positive electrode included in one lattice falls off at once on both sides of the positive electrode plate. This is ascribed to the characteristics that the expanded grid of the positive electrode plate expands in the specific expanding work direction and that the expanded grid does not have the framework on both the left and right sides thereof. These characteristics do not cause any significant problem in the conventional structure where the positive electrode plate is accommodated in the bag-like separator. In the proposed lead acid storage battery where the negative electrode plate, instead of the positive electrode plate, is accommodated in the bag-like separator, however, the fall-off of the active material significantly worsens the life cycle of the battery. This phenomenon is especially prominent under the high vibrating conditions, for example, in recreational vehicles widely used.

BRIEF SUMMARY OF THE INVENTION

The object of the present invention is thus to prevent an active material from falling off a positive electrode plate and to improve the life cycle of a lead acid storage battery under high vibrating conditions, where the lead acid storage battery has the positive electrode plate including an expanded grid and a negative electrode plate accommodated in a bag-like separator.

The present invention is directed to a lead acid storage battery comprising an assembly element which comprises a plurality of positive electrode plates and negative electrode plates that are stacked alternately, each negative electrode plate being accommodated in a bag-like separator, wherein the separator is provided by folding a fine porous synthetic resin sheet and sealing left and right overlapping sides of the folded sheet to have a bag-like shape the separator having a plurality of vertical ribs that are formed in parallel to one another on an outer surface of the separator and that are located in a central portion of the separator occupying a most part of its width, the separator further having small rib areas that extend along a length of the bag-like separator and that are arranged on left and right sides thereof, each of the small rib areas including a large number of small ribs that intersect left or right side end of the positive electrode plate.

In accordance with one preferable mode of the present invention, the positive electrode plate comprises a grid which'substantially does not have a vertical framework, and a paste of active material applied to the grid.

It is preferable that a lattice width of the grid is not greater than 1.4 times a width of the each small rib area.

In accordance with another preferable mode of the present invention, some or all ends of the small ribs on a center side of the separator are continuous with an adjoining vertical rib;

In accordance with still another preferable mode of the present invention, each of the small ribs is arranged to have its longitudinal axis inclined to the horizontal direction.

In accordance with another preferable mode of the present invention, the positive electrode plate comprises an expanded grid of an lead-calcium-tin alloy and a paste of active material applied to the expanded grid.

It is preferable that a content of tin in the lead-calcium-tin alloy ranges from 0.7 to 2.2% by weight.

It is also preferable that a content of calcium in the lead-calcium-tin alloy ranges from 0.05 to 0.09% by weight.

While the novel features of the invention are set forth particularly in the appended claims, the invention. both as to organization and content, will be better understood and appreciated, along with other objects and features thereof, from the following detailed description taken conjunction with the drawings.

It will be recognized that some or all of the figures are schematic representations for purposes of illustration and do not necessarily depict the actual relative sizes or locations of the element shown.

DETAILED DESCRIPTION OF THE INVENTION

Figure 1:
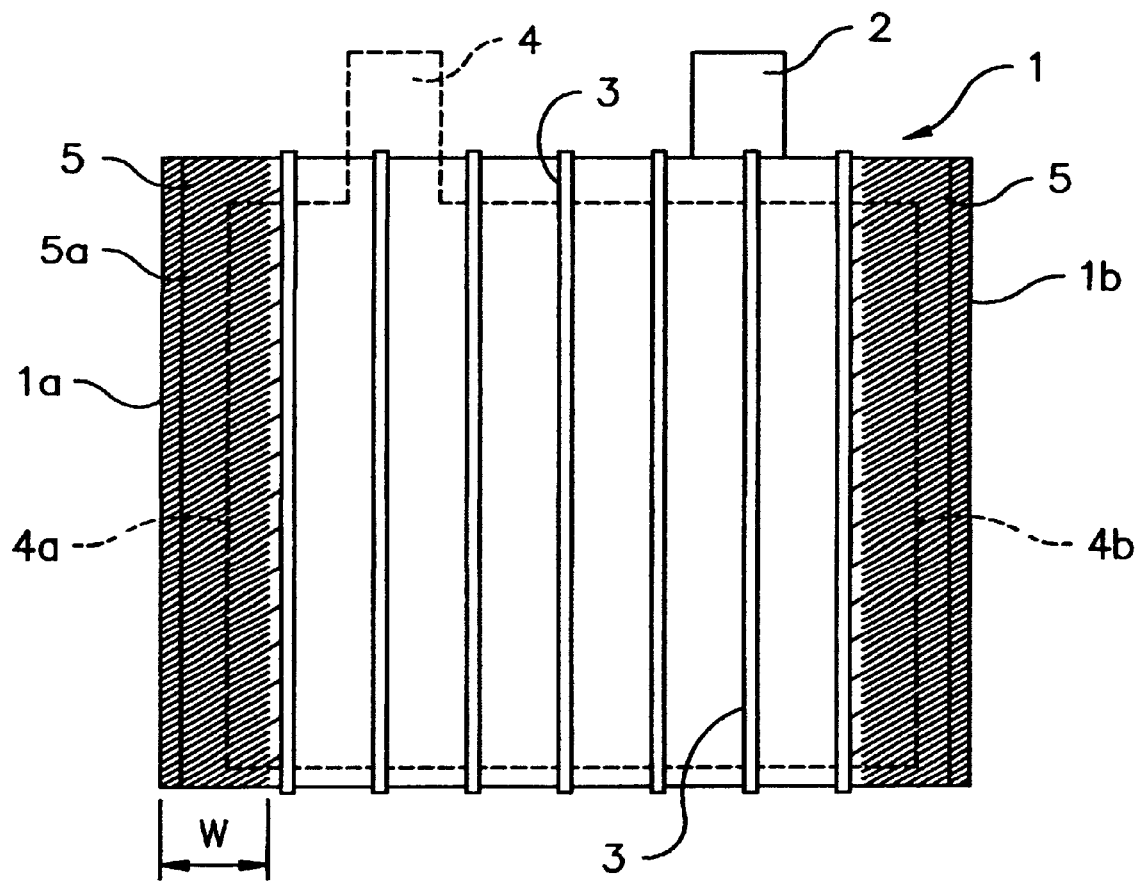
FIG. 1 is a front view illustrating a bag-like separator in one embodiment according to the present invention.

FIG. 1 shows a bag-like separator 1 used for a lead acid storage battery of the present invention the bag-like separator 1 is a bag with an upper opening and is provided by folding a fine porous polyethylene sheet in two and joining both left and right sides 1a and 1b thereof with a mechanical seal. A negative electrode plate 2 is accommodated in the bag-like separator 1. A plurality of vertical ribs 3 are formed in parallel to one another on a central portion of an outer surface of the bag-like separator 1. Small rib areas 5 are formed at positions corresponding to left and right side ends 4a and 4b of a positive electrode plate 4 (shown by the dotted line) on the outer surface of the bag-lie separator 1. Each small rib area 5 extends along the length of the bag-like separator 1 and includes a large number of small ribs 5a that intersect the left side end 4a or the right side end 4b of the positive electrode plate 4.

Figure 3:
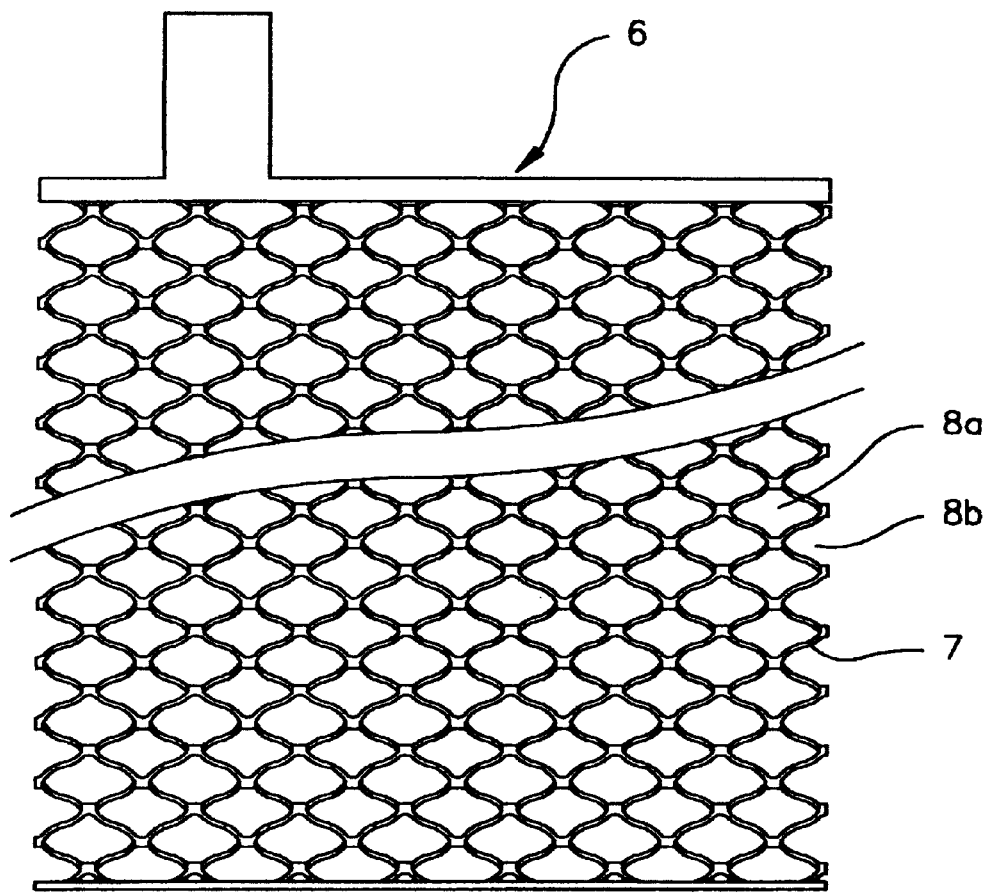
FIG. 3 is a front view illustrating a grid of a positive electrode plate.

As shown in FIG. 3, the positive electrode plate 4 includes an expanded grid 6 and an active material filled therein. The expanded grid 6 does not have a framework by the process of manufacture. The active material that is present in a specific area 8b, which is not surrounded by a grid wire 7 in the vicinity of the left or right side end of the expanded grid 6, tends to fall off more readily than the active material that is present in another area 8a, which is surrounded by the grid wire 7. The arrangement of the present invention effectively prevent the active material in the specific area from readily falling off. The expanded grid 6 is preferably composed of a lead-calcium-tin alloy containing 0.7 to 2.2% by weight of tin, in order to exert the effects of the present invention remarkably.

Figure 2:
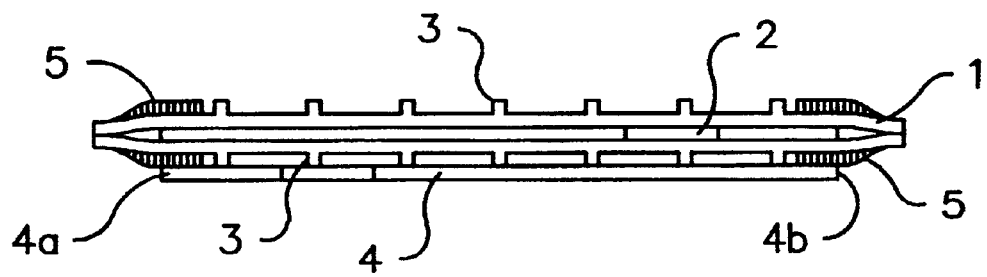
FIG. 2 is a plan view showing an arrangement of the separator and electrode plates.

FIG. 2 is a plan view showing an arrangement of the separator and the electrode plates in the lead acid storage battery of the present invention. The negative electrode plate 2 is accommodated in the bag-like separator 1. The vertical ribs 3 are ford on the central portion of the outer surface of the bag-like separator 1. The positive electrode plate 4 is interposed between the two bag-like separators 1 and supported by the vertical ribs 3 and the small rib areas 5 on the separators 1. The small ribs 5a are arranged to intersect the left and right side ends 4a and 4b of the positive electrode plate 4, so as to support the active material in the specific areas 8b, which are not surrounded by the grid wire 7. This arrangement effectively prevents the active material from falling off to worsen the life cycle of the battery, which occurs in the prior art structure.

Figure 4:
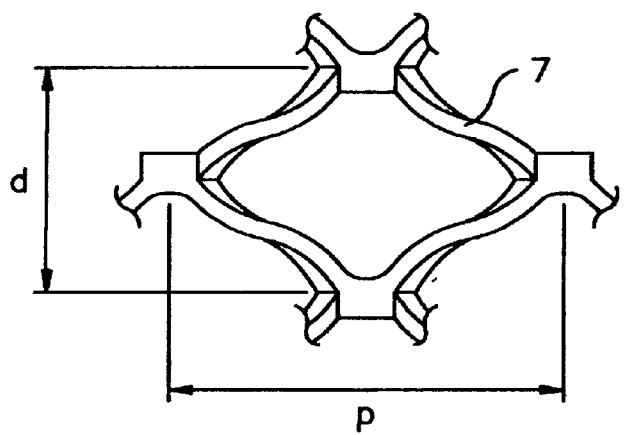
FIG. 4 is an enlarged view showing a main part of the grid.

Referring to FIG. 4. the expanded grid 6 is typically manufactured by cutting slits in a zigzag arrangement on a lead alloy sheet in the lateral direction thereof and expanding the lead alloy sheet in the vertical direction. A lattice width p is greater than a lattice length d. In order to effectively prevent the active material from falling off the specific areas 8b, which are not surrounded by the grid wire on the left and right side ends of the expanded grid, it is preferable that a width w of the small rib area 5 has an overlapping part of at least p/2, which overlaps the side end of the positive electrode plate.

From one point of view, it is preferable that the small ribs 5a are arranged to be not in direct contact with the vertical rib 3. When the small ribs 5a are in contact with the vertical rib 3, a dam is formed between the small ribs 5a and the vertical rib 3 to block the flow of an electrolyte and thereby interferes with diffusion of the electrolyte in the vertical direction. In order to ensure the sufficient diffusion of the electrolyte, it is preferable that the small ribs 5a are apart from the vertical rib 3.

From another point of view, on the other hand, it is preferable that the small ribs 5a are continuous with the vertical rib 3. The continuous arrangement of the small ribs 5a with the vertical rib 3 effectively prevents the side of one separator from entering a clearance between the small ribs 5a and the vertical rib 3 on an adjoining separator in the process of laying a large number of separators, in which negative electrode plates are accommodated, one upon another. This arrangement also prevents the side end of a positive electrode plate from entering a clearance between the small ribs 5a and the vertical rib 3 on an adjoining separator in the process of providing a group of electrode plates. The continuous arrangement enhances the strength against the expansion and contraction due to vibrations.

From these points of views as shown by the dotted line in FIG. 1, it is preferable that part of the small ribs 5a, for example, at a rate of one per five small ribs, are designed to be continuous with an adjoining vertical rib.

The bag-like separator is manufactured by folding one separator sheet in two. When small ribs are arranged to be inclined in one specified direction on the separator sheet, the ribs on one face of a bag-like separator are inclined in a different direction from that of the small ribs on the other face of the bag-like separators. This arrangement effectively prevents the small rib on one separator from entering a space between the small ribs on an adjoining separator in the process of laying a large number of separators, in which negative electrode plates are accommodated, one upon another. It is thus easy to position the large number of separators in the vertical direction.

The assembly element, which is obtained by laying the negative electrode plates 2 accommodated in the bag-like separators 1 and the positive electrode plates 4 one upon another, is inserted in a battery case. A lead acid storage battery is completed by a known method through the processes of connection between cells, welding of a cover to the battery case, welding terminals, and formation charging.

Figure 5:
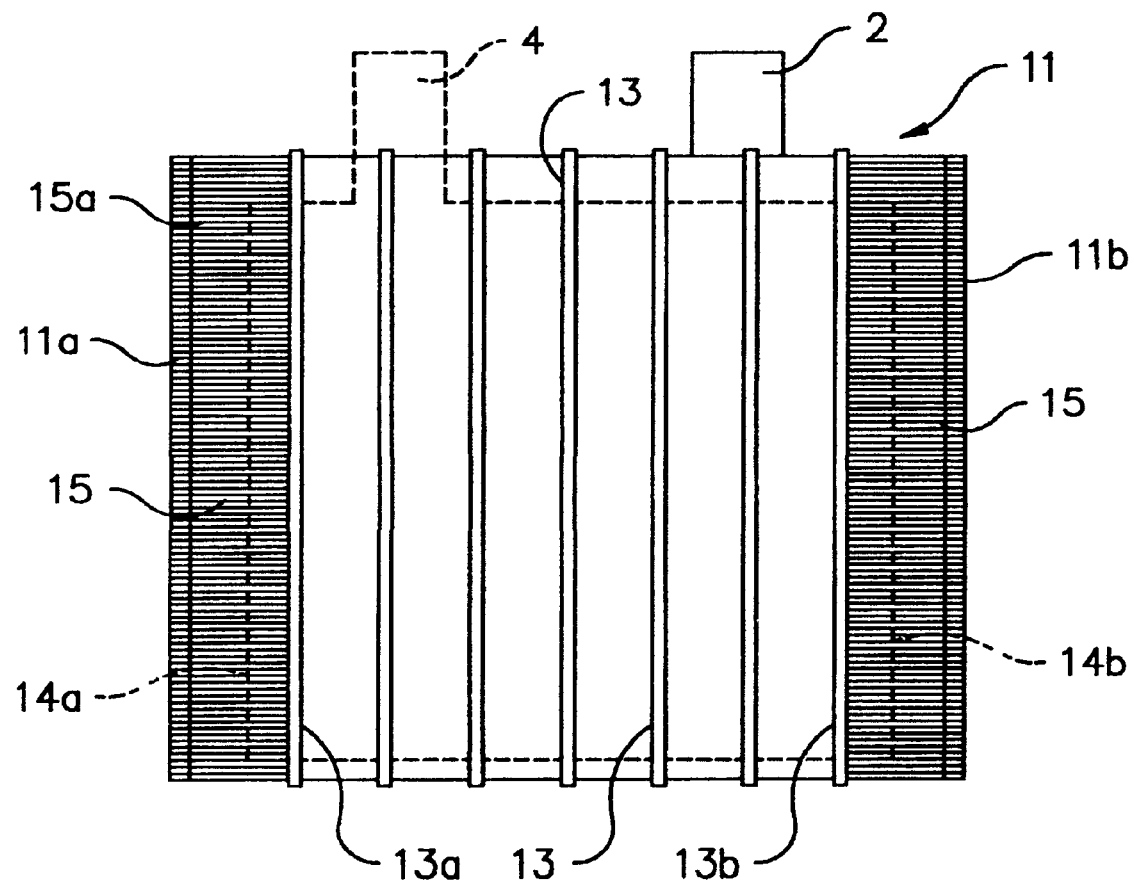
FIG. 5 is a front view illustrating another bag-like separator in another embodiment according to the present invention.

The assembly element satisfies an expression man, where m and n respectively denote the number of negative electrodes and the number of positive electrodes included in the assembly element. This arrangement decreases the required number of separators and advantageously reduces the manufacturing cost of the storage battery FIG. 5 shows a bag-like separator 11 in another embodiment according to the present invention. The separator 11 has a left side 11a and a right side 11b joined with a mechanical seal. The negative electrode plate 2 is accommodated in the bag-like separator 11. A plurality of vertical ribs 13 are arranged on a central portion of an outer surface of the bag-like separator 11. Small rib areas 15, which extend along the length of the separator 11 and include a large number of small ribs 15a, are formed on left and right sides of the separator 11. In the example of FIG. 1, the small ribs 5a are inclined and not continuous with adjoining vertical ribs. In the example of FIG. 5, on the other hand, the small ribs 15a are perpendicular to and continuous with adjoining vertical ribs 13a and 13b.

EXAMPLE 1

An expanded grid composed of Pb-0.08 wt % Ca-1.25 wt % Sn alloy and an expanded grid composed of Pb-0.08 wt % Ca-0.25 wt % Sn alloy were respectively used for a positive electrode plate and a negative electrode plate. Each expanded grid was manufactured by cutting slits in a zigzag arrangement on a sheet which was obtained by cold rolling a cast slab of the alloy in multiple stages, in the rolling direction and expanding the sheet in a direction perpendicular to the slits. A paste of active material was prepared by adding water and diluted sulfuric acid to a mixture of metallic lead powder and lead oxide powder and kneading the mixture. The expanded grid was filled with the paste of active material, cured, and dried to give the positive electrode plate and the negative electrode plate Lignin sulfonate sodium salt and barium sulfate as shrink resistant reagents and carbon powder as other additive were mixed with the paste of active material for the negative electrode plate. The width p and the length d of the lattice in the expanded grid were 11 mm and 8 mm, respectively.

A bag-like separator as shown in FIG. 1 was provided by folding a fine porous polyethylene sheet of 0.2 mm in thickness having vertical ribs and small ribs in two and mechanically sealing left and right sides having a width of 2.5 mm that were pressed between a pair of engaging gears. The bag-like separator had a length of 121 mm and a width of 152 mm. The vertical ribs 3 had a trapezoidal shape having an upper side of 0.3 mm, a lower side of 0.8 mm, and a height of 0.9 mm, and were arranged at a pitch of 9.8 mm. The small ribs 5a had a semicircular shape having a radius of 0.2 mm and were arranged at a pitch of 1 mm. The width w of the small rib area 5 was 12 mm. The small ribs 5a were inclined at approximately 45 degrees to the horizontal direction.

Six negative electrode plates respectively accommodated in the bag-like separators and five positive electrode plates were alternately laid one upon another to constitute an assembly element. The assembly element was inserted in a mono-block battery case, in which six cells were connected in series and a lead acid storage battery having a voltage of 12 V and a nominal capacity of 48 Ah was manufactured by the known method. The electrode plates had a length of 114.5 mm and a width of 137.5 mm.

A battery A was thus obtained as an example of the present invention.

Batteries B, C, D, and E were manufactured as comparative examples.

Battery B of Comparative Example

Figure 9:
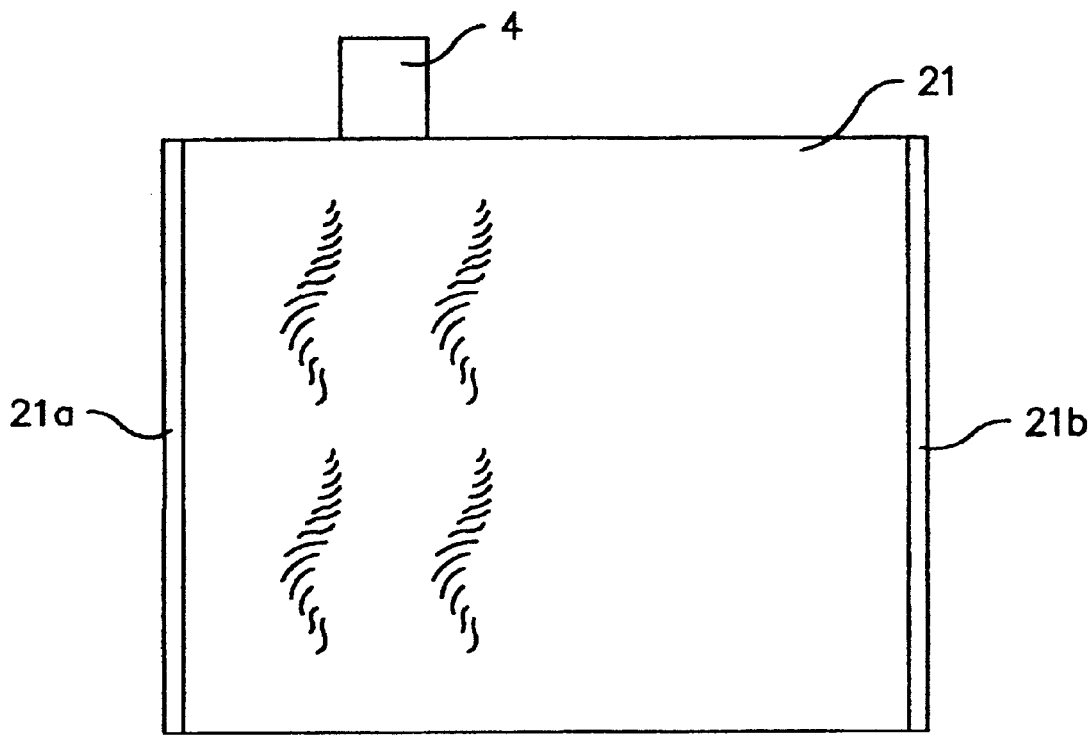
FIG. 9 is a front view illustrating a prior art separator.
Figure 10:
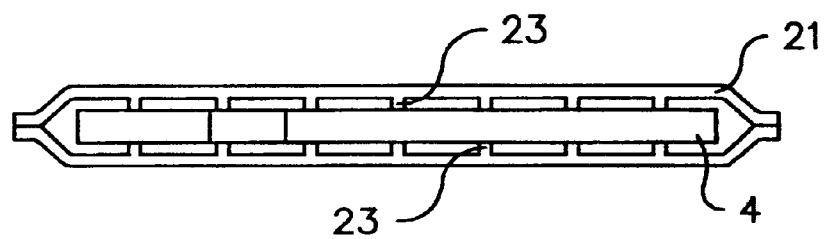
FIG. 10 is a plan view showing a state in which a positive electrode plate is accommodated in the separator of FIG. 9.

A bag-like separator 21 was prepared by folding a separator sheet in two and joining left ad right sides 21a and 21b with a mechanical seal as shown in FIGS. 9 and 10. Vertical ribs 23 having the same dimensions as those of the vertical ribs 3 discussed above were formed at a pitch of 9.8 mm on the inner surface of the bag-like separator 21. A cast grid composed of Pb-0.08 wt % Ca-0.25 wt % Sn alloy was applied for the positive electrode plate 4, which was accommodated in the bag-like separator 21. The positive electrode plates respectively accommodated in the bag-like separators and the negative electrode plates were alternately laid one upon another to constitute an assembly element. The other construction of the battery B is the same as that of the battery A.

Battery C of Comparative Example

The battery C was manufactured in the same manner as the battery B, except that the cast grid was replaced by an expanded grid composed of the same alloy.

Battery D of Comparative Example

The battery D was manufactured in the same manner as the battery B, except that the cast grid was replaced by an expanded grid composed of Pb-0.08 wt % Ca-1.25 wt % Sn alloy.

Battery E of Comparative Example

The battery 1 was manufactured in the same manner as the battery A, except that the bag-like separator had vertical ribs on its outer surface but not small ribs.

A cycle life test according to JIS D5301 was carried out under vibrating conditions at 75° C. with regard to the batteries A, B, C, D, and E. The vibrating conditions were as follows: multi-amplitudes of 2.3 to 2.5 mm, an acceleration of 9.8 m/s$^2$, and repeated vibrations for one hour upward and downward, for one hour backward and forward, and for one hour leftward and rightward. For the purpose of comparison, the cycle life test was also carried out without any vibrations.

The following describes the outline of the cycle life test according to JIS D5301. One cycle includes a discharge of the battery at a discharge current of 25 A for 4 minutes and a consecutive charge of the battery with a charging voltage of 14.8 V (maximum current: 25 A) for 10 minutes. The battery is left for 56 hours after 480 cycles and continuously discharged at a reference current of 356 A for 30 seconds. The voltage is measured after the 30-second discharge. After the measurement the battery is charged under the same conditions mentioned above. This procedure is repeated, and the cycle life of the battery is defined as the number of cycles when the voltage measured after the 30-second discharge becomes equal to 7.2 V. Purified water is added to the electrolyte according to the requirements since the volume of the electrolyte decreases during the test.

Figure 6:
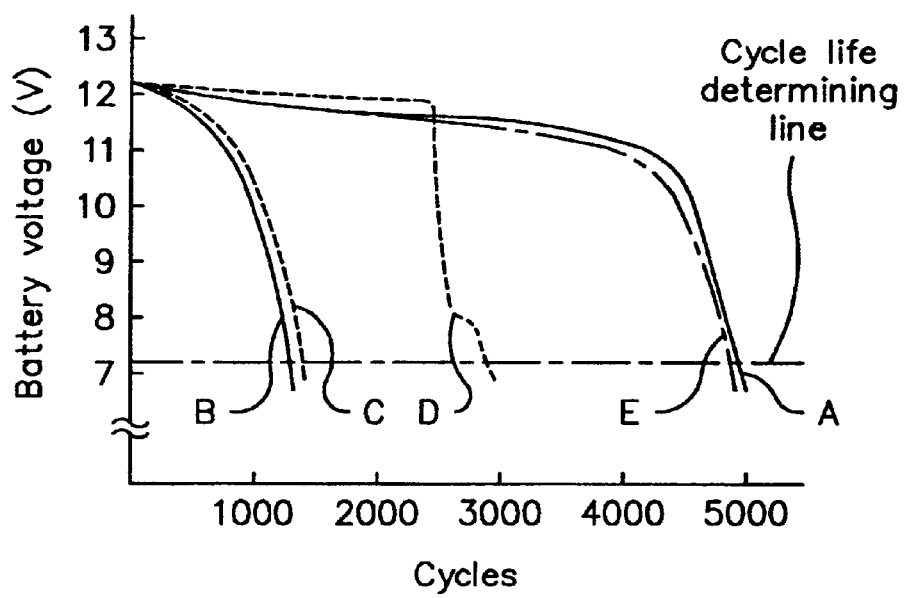
FIG. 6 is a graph showing life cycle characteristics of batteries of examples according to the present invention and comparative examples.

The graph of FIG. 6 shows the results of the cycle life test without any vibrations. The battery A of the present invention and the battery B of the comparative example had the better cycle life characteristics than those of the batteries B, C, and D of the comparative examples. In the battery B of the comparative example having the worst cycle life the grid of the positive electrode plate corroded to an extreme degree and did not have the original shape. In the battery C of the comparative example the grid of the positive electrode plate also corroded to a significant degree. In the battery D of the comparative example, the expanded grid of the positive electrode plate expanded in the expanding work direction (corresponding to the length of the positive electrode plate) to make a hole in the bottom of the bag-like separator. The positive electrode was accordingly in contact with the negative electrode and caused a short circuit. As clearly understood from the variation in voltage of the battery D, the short circuit abruptly occurred. This means that the battery abruptly falls in a disabled state in the actual use. When this phenomenon occurs in a storage battery mounted on an automobile, the automobile abruptly stops. This is extremely inconvenient to the driver of the automobile. The battery C had substantially no damage in the bottom of the separator, which was found in the battery D. This is ascribed to the fact that the corrosion to a significant degree remarkably lowers the strength of the grid before the grid expands to damage the separator, and no large stress is accordingly generated to damage the separator.

Increasing the concentration of tin in the alloy used for the grid of the positive electrode plate accommodated in the bag-lie separator enhances the strength of the grid and improves the cycle life of the battery. The increased concentration of tin on the other hand, increases the possibility of damaging the bottom of the separator and causing an abrupt failure of the storage battery.

Figure 7:
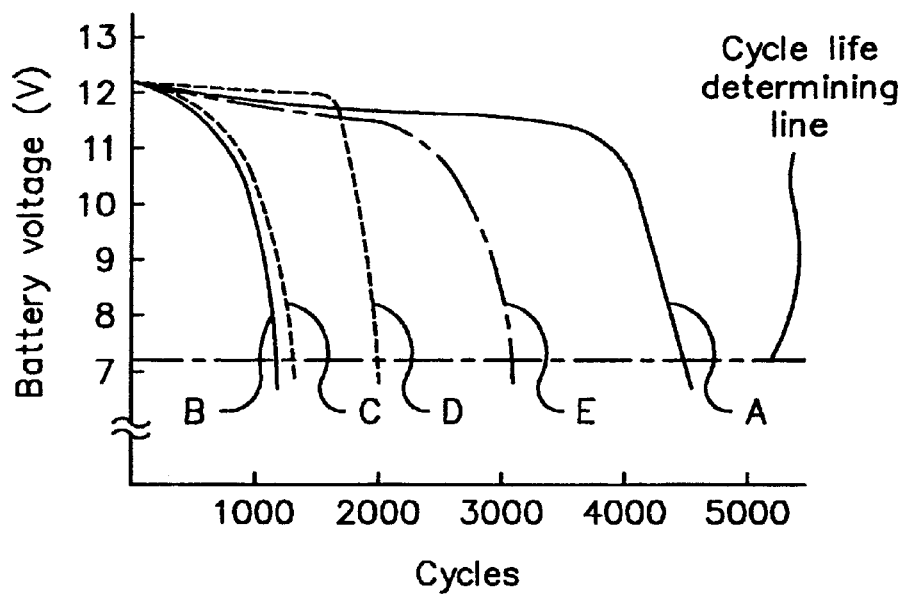
FIG. 7 is a graph showing life cycle characteristics of the batteries of the examples according to the present invention and the comparative examples under a vibrating condition.

The graph of FIG. 7 shows the results of the cycle life test under the vibrating conditions discussed above. The results of FIG. 7 show that the cycle life was a little worsened with regard to the batteries B, C, and D, compared with the case without any vibrations. The battery E of the comparative example was more significantly affected by the vibrations than the batteries B through D, and had a remarkable decrease in cycle life. The battery 9 was disassembled for the purpose of elucidation of the cause of this remarkably worsened cycle life. The active material fell off from the specific areas, which were not surrounded by the grid wire, on the left and right side ends of the positive electrode plate. The battery A of the present invention had the excellent cycle life characteristics, compared with the batteries of the comparative examples. The battery A was also disassembled. The main factor of the worsened cycle life of this storage battery was the general softening of the active material of the positive electrode. There was substantially no fall-off of the active material, which was observed in the battery E. It is thought that the small ribs formed on the left and right sides of the outer surface of the bag-like separator prevent the active material from falling off.

EXAMPLE 2

Figure 8:
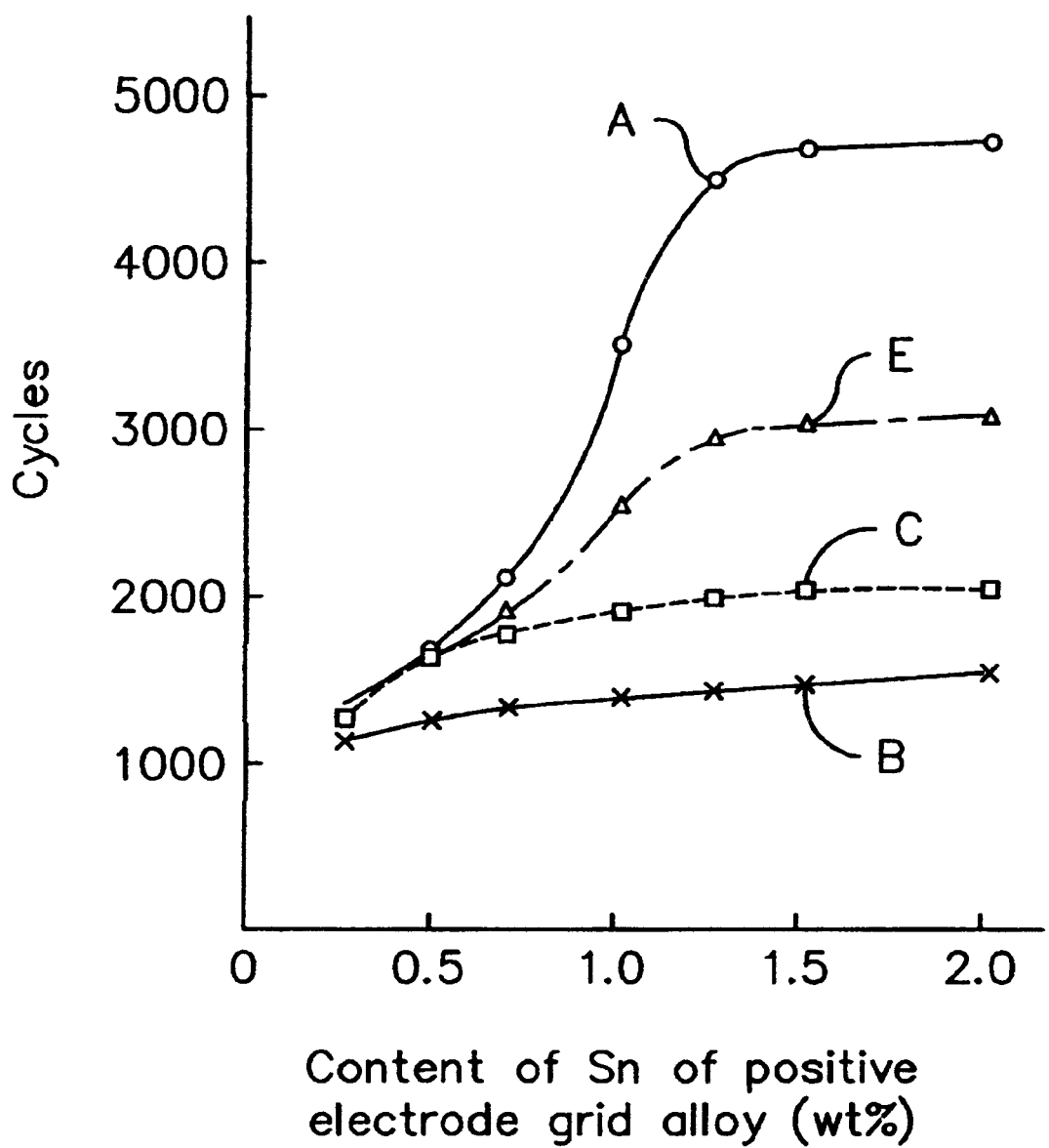
FIG. 8 is a graph showing the relationship between the content of tin in the alloy applied for the grid of the positive electrode plate and the life cycle with regard to the batteries using a variety of separators.

The battery A of Example 1 and the batteries B through E of the comparative examples were subjected to a light load cycle life test under the vibrating conditions discussed in Example 1 while the content of tin in the alloy used for the grid of the positive electrode plate was varied. The graph of FIG. 8 shows the results of the test. The battery A of the present invention showed a remarkable improvement in cycle life when the content of tin in the alloy used for the grid of the positive electrode plate was not less than 0.7% by weight, compared with the batteries of the comparative examples. Especially when the content of tin in the alloy was equal to 0.9% by weight, the cycle life of the battery A was extended to 3100 cycles and the cycle life of the battery E was extended to 2400 cycles. It is accordingly preferable that the content of tin in the alloy is not less than 0.9% by weight. When the content of tin in the alloy for the grid of the positive electrode plate was less than 0.7% by weight, the cycle life of the battery A was not significantly different from the cycle life of the battery D of the comparative example (in which the positive electrode plate was accommodated in the bag-like separator). In this range of the Sn concentration, the grid of the positive electrode plate has a low strength and does not damage the bottom of the bag-like separator, in which the positive electrode plate is accommodated. The expanding work requires that the content of tin in the alloy used for the grid of the positive electrode plate is not greater than 2.2% by weight. When the content of tin in the alloy exceeds 2.2% by weight. there may be cracks at the joints of the grid wire in the process of the expanding work. This may increase the possibility of worsening the cycle life of the battery.

EXAMPLE 3

(1) Example 3-1

As shown in FIG. 5, a bag-like separator was prepared by folding a fine porous polyethylene sheet in two and joining left and right sides with a mechanical seal. Vertical ribs having a trapezoidal cross section and the same dimensions as those defined with FIG. 1 were arranged on the outer surface of this separator. A large number of small ribs having a semicircular cross section of 0.2 mm in radius and a length of 8 mm (namely the width of the small rib area was also 8 mm) were arranged at a pitch of 1 mm on the left and right sides of the separator. The respective ends of the small ribs on the center side of the separator were continuous with an adjoining vertical ribs. A negative electrode plate accommodated in the bag-like separator (hereinafter referred to as the separator "d") was obtained by filling a paste of active material into an expanded grid composed of a rolled sheet of Pb-0.07 wt % Ca-0.2 wt % Sn alloy.

The positive electrode plate was prepared by filling a paste of active material into a cast grid composed of Pb-0.07 wt % Ca-1.2 wt % Sn allay.

Six negative electrode plates respectively accommodated in the bag-like separators and five positive electrode plates were alternately laid one upon another to constitute an assembly element. A lead acid storage battery for the automobile was then assembled in the same manner as

(2) Example 3-2

The battery of Example 3-2 was manufactured in the same manner as the battery of Example 3-1 except that the separator used had the small ribs of 5.0 mm in length (hereinafter referred to as the separator "c") and that an expanded grid was used for the positive electrode plate.

(3) Example 3-3

The battery of Example 3-2 was manufactured in the same manner as the battery of Example 3-1, except that an expanded grid was used for the positive electrode plate.

(4) Example 3-4

The battery of Example 3-4 was manufactured in the same manner as the battery of Example 3-2 except that the separator used had the small ribs of 5.0 mm in length, which were apart from an adjoining vertical rib by approximately 3.0 mm (hereinafter referred to as the separator "e").

Batteries of comparative examples we manufactured as follows:

Comparative Example 1

The battery of comparative Example 1 was manufactured in the same manner as the battery of Example 3-1, except that the separator used did not have any vertical ribs or small ribs (here after referred to as the separator

Comparative Example 2

The battery of Comparative Example 2 was manufactured in the same manner as the battery of Example 3-1, except that the separator used had vertical ribs but not small ribs (hereinafter referred to as the separator "b").

Comparative Example 3

The battery of Comparative Example 3 was manufactured in the same manner as the battery of Comparative Example 1 except that an expanded grid was used for the positive electrode plate.

Comparative Example 4

The battery of Comparative Example 4 was manufactured in the same manner as the battery of comparative Example 2, except that an expanded grid was used for the positive electrode plate.

Table 1 shows the constructions of the respective batteries.

TABLE 1

| Battery | Grid of positive electrode | Separator | Remarks |
|---|---|---|---|
| a | Cast grid | Separator a (without ribs) | Comparative example 1 |
| b | Same as above | Separator b (with vertical ribs on outside of bag) | Comparative example 2 |
| c | same as above | Separator d | Example 3-1 |
| d | Expanded grid | Separator a (without ribs) | Comparative example 3 |
| e | same as above | Separator b (with vertical ribs on outside af bag) | Comparative example 4 |

TABLE 1-continued

| Battery | Grid of positive electrode | Separator | Remarks |
|---|---|---|---|
| f | same as above | Separator c | Example 3-2 |
| g | same as above | Separator d | Example 3-3 |
| h | same as above | Separator e | Example 3-4 |

The cycle life test was carried out under the conditions discussed in Example 1 with regard to batteries "a" through "h" in Table 1. Table 2 shows the results of the cycle life test. The cycle life in Table 2 is specified as an index relative to the cycle life of the battery "a" set equal to 100.

TABLE 2

| Battery | Cycle life under vibrations (Index relative to cycle life of battery R = 100) | Cycle life without vibrations (Index relative to cycle life of battery a = 100 under vibrating conditions) |
|---|---|---|
| a | 100 | 140 |
| b | 130 | 180 |
| c | 190 | 190 |
| d | 110 | 150 |
| e | 130 | 170 |
| f | 200 | 220 |
| g | 220 | 220 |
| H | 180 | 210 |

As shown in Table 2, the batteries "c", "f", "g", and "T" of the present invention had improved cycle life characteristics, compared with the batteries "a", "b", and "d" of the comparative examples. These batteries were disassembled after the cycle life test. In the batteries "a" and "d", oxidation made holes on the whole surface of the separator, and the active material of the positive electrode plate, which was not accommodated in the separator, fell off to a significant extent. In the batteries "b" and "e", the left and right side ends of the positive electrode plate damaged the left and right sides of the separator and made holes, and the positive electrode plate was in contact with the negative electrode plate to cause a short circuit. In these batteries "b" and "e", the active material fell off especially on the left and right side ends of the electrode plate, which was not accommodated in the separator. This fall-off phenomenon was especially remarkable in the battery "e", for which the expanded grid was used.

In the batteries "c", "f", "g", and "h" of the present invention, on the other hand, the left and right side ends of the electrode plate, which was not accommodated in the bag-like separator, did not make holes in the separator. In the battery "h" where the small ribs were not continuous with an adjoining vertical rib, little cracks occurred along the discontinuous parts between the small ribs and the adjoining vertical ribs in the batteries "c", "f", and "g" of the present invention, there were no such cracks nor any damage of the separator. The main factor of the worsened cycle life was the fall-off of the active material. There was a difference in cycle life between the batteries "f" and "g" of the present invention. This may be ascribed to the difference in state of adhesion of the active material to the grid on the left and the right side ends of the electrode plate, which is not accommodated in the bag-like separator. In the battery "f" where the rate of the lattice width p to the width of the small rib area was equal to 2.2, the active material was partly peeled off the grid on the left and the right side ends of the electrode plate. In the battery "g" where the rate of the lattice width p to the width of the small rib area was equal to 1.4, on the other hand, there was no peel-off of the active material.

As described above, in the lead acid storage battery of the present invention, the negative electrode plate is accommodated in a bag-like separator composed of a fine porous synthetic resin sheet. The structure of the present invention prevents the active material from falling off the positive electrode plate, which is not accommodated in the bag-like separator, due to vibrations of the electrode plate and protects the separator from damages. This effectively prevents a decrease in cycle life of the battery under the vibrating conditions.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claim be interpreted as covering all alterations and modifications as fall within the true spirit and scope of the invention.

What is claimed is:

1. A lead acid storage battery comprising an assembly element which comprises a plurality of positive electrode plates and negative electrode plates that are stacked alternately, each negative electrode plate being accommodated in a bag shaped separator, wherein said separator is provided by adding a fine porous synthetic resin sheet ad sealing left and right overlapping sides of small folded sheet to have a bag shape, said separator having a plurality of vertical ribs that are formed in parallel to one another on an outer surface of said separator and that are located in a central portion of said separator occupying a major part of its width, said separator further having rib areas that extend along a length of said bag-shaped separator and that are arranged on left and right sides thereof each of said rib areas including a large number of small ribs that intersect a left or right side end of said positive electrode plate, wherein the small ribs support active material in areas of the positive electrode.

2. The lead acid storage battery in accordance with claim 1, wherein said positive electrode plate comprises a grid, which substantially does not have a vertical framework, and a paste of active material filled in said grid.

3. The lead acid storage battery in accordance with claim 2, wherein a lattice width of said grid is not greater than 1.4 times a width each of said rib areas.

4. The lead acid storage battery in accordance with claim 1, wherein some or all ends of said ribs on a central portion of a side of said separator are continuous with an adjoining vertical rib.

5. The lead acid storage battery in accordance with claim 1, wherein said positive electrode plate comprises an expanded grid of an lead-calcium-tin alley and a paste of active material filled in said expanded grid.

6. The lead acid storage battery in accordance with claim 5, wherein a content of lead in the lead-calcium-tin all ranges from 0.7 to 2.2% by weight.

7. The lead acid storage battery in accordance with claim 6, wherein a content of calcium in the lead-calcium in alloy ranges from 0.05 to 0.09% by weight.

8. The lead acid storage battery in accordance with claim 5, wherein a width each of said rib areas is designed to have an overlapping area that overlaps an end of said positive electrode plate and that is at least half a lattice width of said expanded grid.

9. The lead acid storage battery in accordance with claim 5, wherein a number of said negative electrode plates is identical with or smaller by one than a number of said positive electrode plates.

10. The lead acid storage battery in accordance with claim 1, wherein each of said ribs is arranged to have its longitudinal axis inclined to the horizontal direction.

* * * * *